April 16, 1935.    P. E. CLAWSON    1,997,858
COUPLING
Filed Oct. 7, 1933
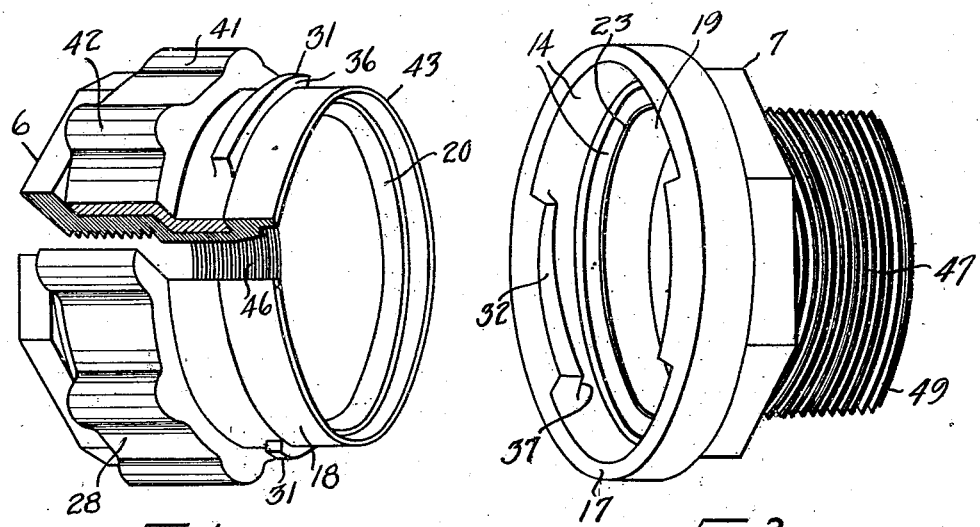
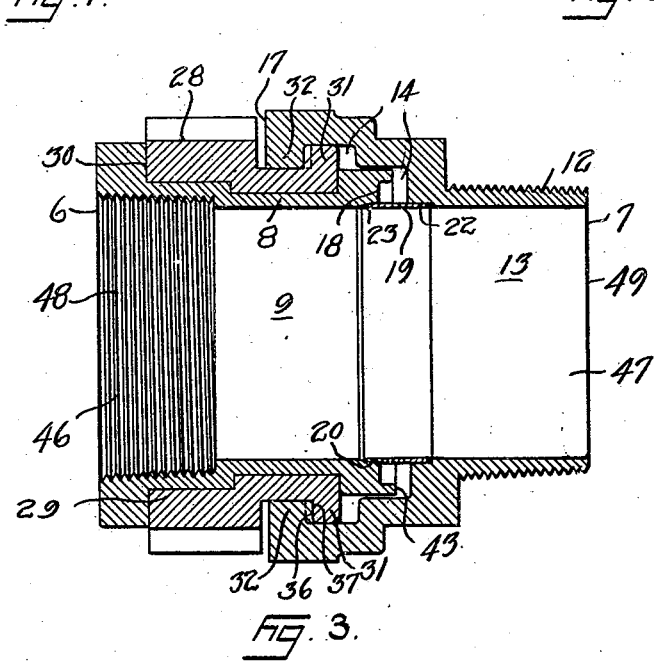
INVENTOR.
PHILIP E. CLAWSON
BY Joseph B. Gardner
his ATTORNEY Patented Apr. 16, 1935

1,997,858

UNITED STATES PATENT OFFICE 1,997,858

COUPLING

Philip E. Clawson, Oakland, Calif.

Application October 7, 1933, Serial No. 692,630

5 Claims. (Cl. 285—177)

The invention relates to means for connecting portions of and extensions to fluid systems, and more particularly to manually detachable coupling members adapted to afford ready connection and disconnection of delivery tubes and the like to a fluid supply main.

An object of the invention is to provide a coupling of the character described that will provide for a ready attachment and detachment of the coupling members and will afford a substantial fluid seal without the use of auxiliary packing means or compressible sealing washers as have heretofore been used.

Another object of the invention is to provide a coupling of the character described wherein the fluid passages of the engageable coupling members are sealed in registration by means of a resilient and yieldable metal contact portion carried by one of the members and which is adapted to flex and conform to the shape of minor irregularities in the surface contour of the abutting coupling member, thus while affording for an effective seal, at the same time, permitting of a wide range of interchangeability between a plurality of coupling members.

A further object of the invention is to provide a coupling of the character described in which a substantial locking of the coupling members is afforded without involving any cumbersome or extraneous parts.

A still further object of the invention is to provide a coupling with above mentioned advantages, in which the connecting and locking portions of the members will be completely covered and protected when the coupling is in operative position.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a perspective view shown partly in section of one of the coupling members of my invention.

Figure 2 is a perspective view of the coupling member adapted to engage with the coupling member shown in Figure 1.

Figure 3 is a longitudinal sectional view of the coupling members operatively engaged with one another.

Referring to the drawing, the device of my invention comprises a pair of coupling members 6 and 7 arranged for engagement with each other for operatively connecting portions of a fluid circulating system. As here shown, the member 7 is particularly arranged for permanent connection to a main or other source of fluid supply such as a pump or storage tank, while the member 6 is especially adapted for connection to an extension to the fluid system such as a hose and is arranged for detachable coupling with the member 7.

The member 6 comprises a cylindrical casing 8 having a bore 9 disposed centrally and longitudinally therethrough for the transmission of fluid. The member 7 comprises a cylindrical casing 12 which is likewise provided with a longitudinally extending bore 13 which is disposed to register with bore 9 when the two members are operatively coupled. To facilitate the coupling of the members, the casing 12 is preferably provided with an enlarged bore portion 14 opening to an end 17 thereof and designed for receiving and housing an end 18 of the member 6. The bore portion 14 is formed concentric with the bore 13 so that upon the introduction of the end 18 into the bore 14, the bores 9 and 13 will be disposed in alignment.

The members 6 and 7 are arranged to be coupled with a sealed joint between the bores 9 and 13, and a most important part of the invention is the means provided for effecting such seal. In accordance with my invention these two passageways may be sealed in registration, exclusively by a metal to metal contact of the coacting sealing surfaces, and without the use of loose or displaceable parts or the inclusion in any manner of soft compressible packing material as heretofore required. For such contact there is utilized coacting interfitting annular elements forming fixed parts of the respective coupling members and designed with one capable of flexure and the other relatively inflexible whereby on fitting one forcibly within the other a firm resilient contact between the metal sealing surfaces will be provided over the entire annular area. In the instant embodiment the flexible element comprises a thin walled highly resilient metallic band 19 formed integral with or otherwise fixedly carried by the member 7 and disposed to engage a relatively non-flexible portion 20 provided as an integral portion of the member 6. The band 19 is secured to the casing 12 with an end portion 22 thereof set in a recess so as to position the inner surface of the band flush with the walls of the bore 13. The remainder of the band extends into the enlarged bore 14 with the free end 23 thereof disposed to engage the portion 20 which as will be clear from Figure 3 is provided at the end 18 of the casing 8 and forms a divergent tapered part of the bore 9. It will thus be clear that on movement of the members longitudinally together, the thin walled end 23 of the band will be resiliently compressed into a close fitting engagement with the non-flexible tapered portion 20 to thereby seal the bores 9 and 13 in registration. It will be understood of course that a sealing contact between the interengaging metal parts could be effected with the band 19 formed of material as solid and as non-flexible as the part on which the portion 20 is provided, but under such circumstances there would be no resiliency of contact unless produced at the expenditure of enormous force. By using my thin band, effective engagement may be obtained by hand manipulation and without the use of elaborate mechanical work translation devices rendering the coupling or uncoupling operation slow and tedious. Also due to the resilient and yielding properties of the band, the same will readily conform in contour to and closely fit any minor irregularities that may be present on the surface 20. Thus carefully and minutely matched surfaces that have heretofore been required in effecting a metal to metal joinder of the character described are not essential in the present coupling. For this reason minor irregularities in the surface of the tapered portion 20 of say a plurality of coupling members would not prevent the use of each of such members as desired in combination with a single cooperating coupling member. Such a situation may obtain in instances where a plurality of discharge connections are to be selectively connected to a single fluid source.

Effective but simple means are provided for drawing into engagement and thereupon locking said coupling members. In the present embodiment such means comprises an actuator sleeve 28 surrounding and rotatably carried by the casing 8. Preferably the inner portion 29 of the sleeve is set into a recess 30 in the outer face of the casing adjacent the end 18 in a manner disposing the periphery of the sleeve substantially flush with such face at such end, thus permitting the introduction of such sleeve portion together with the end 18 into the enlarged bore 14 of the casing 12. Engagement between the sleeve and the casing 12 is in the present embodiment afforded by pairs of opposed segmental lugs 31 and 32 provided on the sleeve and casing respectively, the lugs 31 being formed in radially outstanding position on the sleeve portion 29, while the lugs 32 are formed depending from end 17 of the casing 12 and into the enlarged bore 14. To couple the members together, the sleeve is rotated to position the lugs 31 peripherally spaced between the lugs 32, whereby the end 18 and sleeve portion 29 of the member 6 may be inserted into the enlarged bore 14 of the member 7. Following such insertion the sleeve is rotated to position the lugs 32 to thereby lock the members together. In order that a longitudinal displacement of the members, and a resultant resilient sealing of the passageways 9 and 13 may be obtained during the coupling of the members, the contacting surfaces 36 and 37 of the lugs 31 and 32 respectively are desirably inclined or spirally disposed to the circumference of the members. By means of this construction it will be clear that upon rotation of the sleeve 28 to cause relative displacement of the lug surfaces 36 and 37, a relative longitudinal displacement between the coupling members will be effected.

If desired the sleeve 28 may be provided with a gripping portion 41 to facilitate the grasping and actuation of this member. As here shown such portion is formed with a plurality of longitudinally extending, peripherally spaced ridges 42.

It will be noted that the outer end of the band 19 is located well within the casing 12 and therefore there will be no likelihood of the end portion 23 becoming damaged such as when the members 6 and 7 are roughly handled in uncoupled condition. For similarly protecting the sealing surface 20 of the member 6, an annular extension 43 is provided at the end 18.

Any means may be provided for connecting the coupling members to a supply main and an extension of a fluid system. As will be evident, the specific form of such means may be varied to best adapt the coupling to the connections at hand. As here shown, female and male threaded portions 46 and 47 are provided at the opposite ends 48 and 49 of the casings 8 and 12 respectively for receiving similarly threaded portions on the extension and supply main respectively.

I claim:

1. In a coupling of the character described, a coupling member comprising a casing having inner walls providing a passageway therethrough and with said walls formed with a tapered portion, a second coupling member comprising a casing having a passageway therethrough, a thin and resilient metallic tube on said second casing in registration with the passageway therethrough and having an end thereof disposed to engage said tapered wall portion of said first casing, and means for securing said coupling members together and serving to flex said tube into resiliently pressed and sealed engagement with said tapered wall portion.

2. In a coupling of the character described, a coupling member comprising a casing having inner walls providing a passageway therethrough and with said walls formed with a divergently tapered portion opening to an end of said casing, a second coupling member comprising a casing having a passageway therethrough, a metallic tube secured to said second casing in registration with the passageway therethrough and having an end thereof disposed to engage said tapered wall portion of said first casing and being of such thinness and resilience as to flex into tightly sealed engagement with said tapered portion on compression thereagainst, and means for manually releasably securing said coupling members together with said tube and wall portion in resiliently pressed engagement.

3. In a device of the character described, a coupling member having inner walls providing a passageway therethrough, said walls having a tapered portion, a second coupling member having a passageway therethrough and arranged for engagement with said first member with said passageways in registration, a resilient metallic sealing means on said second member in registration with the passageway therethrough and disposed for engagement with said tapered wall portion, said means being of such thinness and resilience that when forced into engagement with said tapered wall portion to conform to the shape of and provide a liquid seal with said portion, and means for securing said members together with said sealing means and tapered portion in resiliently pressed engagement.

4. In a device of the character described, a coupling member having inner walls providing a passageway therethrough, said walls having a tapered portion adjacent and divergently opening to an end of said member, a second coupling member having a passageway therethrough and arranged for engagement with said first member with said passageways in registration, a thin and resilient metallic sealing ring on said second member in registration with the passageway therethrough and disposed for engagement with said tapered wall portion, said ring being of such thinness and resilience as to flex when forced into engagement with said tapered wall portion into tightly sealed engagement therewith, and manually operable means for detachably securing said members together with said sealing ring and tapered portion in resiliently pressed engagement.

5. In a device of the character described, a coupling member having inner walls providing a passageway therethrough, said walls having a tapered portion adjacent and divergently opening to an end of said member, a second coupling member having a passageway therethrough and arranged for engagement with said first member with said passageways in registration, a metallic sealing ring on said second member in registration with the passageway therethrough and disposed for engagement with said tapered wall portion, said ring being of such thinness and resilience as to flex when forced into engagement with said tapered wall portion into tightly sealed engagement therewith, and manually operable means for detachably securing said members together with said sealing ring and tapered portion in resiliently pressed engagement, said last named means comprising an actuator member rotatably carried by one of said coupling members, and engageable lugs on said actuator and other of said coupling members arranged upon rotation of said actuator member to draw said coupling members together.

PHILIP E. CLAWSON.